United States Patent [19]

Gullickson

[11] Patent Number: 5,380,030
[45] Date of Patent: Jan. 10, 1995

[54] ENERGY DAMPENING DRAWBAR

[76] Inventor: Russell C. Gullickson, 1001 W. 4th St., Laurel, Mont. 59044

[21] Appl. No.: 18,368

[22] Filed: Feb. 16, 1993

[51] Int. Cl.⁶ .............................................. B60D 1/00
[52] U.S. Cl. .................................. 280/486; 267/138
[58] Field of Search .............. 280/485, 486, 479.2; 267/138, 71, 72, 141

[56] References Cited

U.S. PATENT DOCUMENTS

| | | | |
|---|---|---|---|
| 2,783,039 | 2/1957 | Wilson | 280/486 |
| 3,140,080 | 7/1964 | Rumsey | 280/486 |
| 3,904,226 | 9/1975 | Smalley | 280/486 |

FOREIGN PATENT DOCUMENTS

| | | | |
|---|---|---|---|
| 854215 | 1/1940 | France | 280/486 |
| 1005981 | 1/1952 | France | 280/486 |

Primary Examiner—Mitchell J. Hill
Attorney, Agent, or Firm—Risto A. Rinne, Jr.; Douglas M. Clarkson

[57] ABSTRACT

An energy dampening drawbar for use with receiver hitches and specialty types of hitches is described as including an elongated hollow shank having slots on opposite sides. A first cushion block is located within the shank and has a portion of the first cushion block adjacent one surface of a pin block. The pin block has a hole that aligns with a portion of the two slots. A second cushion block is located within the shank adjacent another surface of the pin block. A first restraint prevents longitudinal travel within the shank by the first cushion block. A second restraint prevents longitudinal travel within the shank by the second cushion block. A plate is attached to one end of the shank to provide a surface for attaching a trailer coupling.

12 Claims, 1 Drawing Sheet

ENERGY DAMPENING DRAWBAR

BACKGROUND OF THE INVENTION

1. Field of the Invention

The present invention, in general, relates to drawbars for towing a trailer and, more particularly, to a drawbar that will dampen the forces of shock and impact that occur between a towing vehicle and a trailer being towed.

A trailer, like all objects, has inertia. When it is at rest, it tends to remain at rest unless acted upon by some force to the contrary. Similarly a trailer in motion tends to remain in motion unless also acted upon by a force to the contrary.

A contrary force is provided by irregularities in a road surface, by gravity and by the towing vehicle when either accelerating or braking. The trailer and towing vehicle are connected together by any of a variety of hitch arrangements; a ball type of hitch coupling arrangement being the most common, and a pintle type of hitch coupling is used sometimes for towing heavier trailers.

Any hitch coupling is a mechanical device having mechanical tolerances between its component parts. These tolerances produce a cumulative gap between the component parts that is more commonly referred to as "slack".

The slack between the component parts of a trailer hitch produces a shock impulse when accelerating as a result of having the towing vehicle move slightly forward before the trailer begins to move. As such, a shock impulse occurs momentarily when all of the existing slack has been taken up by the forward motion of the towing vehicle, and a sudden transference of kinetic energy occurs at the towing interface in the form of an impact.

Similarly when decelerating, either the towing vehicle or the trailer will begin to slow first, depending upon whether trailer brakes are used and how they are adjusted, and once again, when all of the slack has been taken up, an impact will occur.

The impact is perceived by occupants of the towing vehicle as a jolt. The severity of the jolt is proportional to the differences in inertia that arise between the towing vehicle and the trailer. A jolt will occur whenever an imbalance occurs between the inertia of the trailer and the inertia of the towing vehicle.

The severity of the jolt is representative of the balancing of kinetic energy between the towing vehicle and the trailer. Jolts of varying severity occur during acceleration, deceleration and also during normal transit as slight differences in velocity between the towing vehicle and the trailer develop.

Since it is not a practical option to eliminate all slack by reducing the sum total of all of the mechanical tolerances of a trailer hitch and coupling to zero, arrangements that will absorb and dampen shock impulses are preferred.

Such structures, in general, utilize dampening techniques. Mechanical trailer hitch dampening techniques will smoothly and temporarily absorb some of the kinetic energy, and then, smoothly return that energy back to the towing vehicle and to the trailer, thereby lessening the perception of a jolt having occurred by towing vehicle occupants.

Prior trailer hitch dampening arrangements, that smooth the transfer of energy between a trailer and towing vehicle, tend to be somewhat complex in construction and, accordingly, are expensive. Prior dampening arrangements are not readily adaptable to accommodate trailers of varying weight, nor are they readily adaptable for use with common types of trailer hitches, such as for use with receiver types of hitches where a variety of drawbars are inserted.

Accordingly, there exists today a need for an energy dampening drawbar capable of dampening the shock impulses that arise between a trailer and a towing vehicle that is adaptable for use with standard types of receiver hitches and is also adaptable for use with specialty types of receiver hitches including wide ranging types of hitches, ball hitches, and pintle hitches.

2. Description of Prior Art

Energy dampening hitch systems, in general, are known. For example, U.S. Pat. No. 4,515,387 to Schuck that issued May 7, 1985, describes a hitch with a swiveling tongue having cushions to absorb the shock loading.

While the structural arrangements of various types of drawbar devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide an energy dampening drawbar the reduces the shock impulse occurring between a towing vehicle and a trailer.

It is also an object of the invention to provide an energy dampening drawbar that helps to smooth and cushion the ride as perceived by occupants of a vehicle when towing a trailer.

Another object of the invention is to provide an energy dampening drawbar that is suitable for use with a variety of receiver type hitches.

Still another object of the invention is to provide an energy dampening drawbar that is suitable for use with specialty type hitches.

Briefly, an energy dampening drawbar for use with different types of hitches, that is constructed in accordance with the principles of the present invention, has an elongated hollow shank with two slots, one on each side. A pin block, having a hole communicating with both slots, is located within the elongated shank between first and second impact cushioning devices. A trailer can be attached to one end of the drawbar and a towing vehicle can be attached to the drawbar at the hole in the pin block between the two slots in the shank.

Other features, objects and advantages of the present invention will become more readily apparent from the following detailed description of the presently preferred embodiment, which is described in conjunction with above identified FIGURES of drawings which illustrate component parts as an aid to the description.

DETAILED DESCRIPTION OF THE INVENTION

Figure 1:
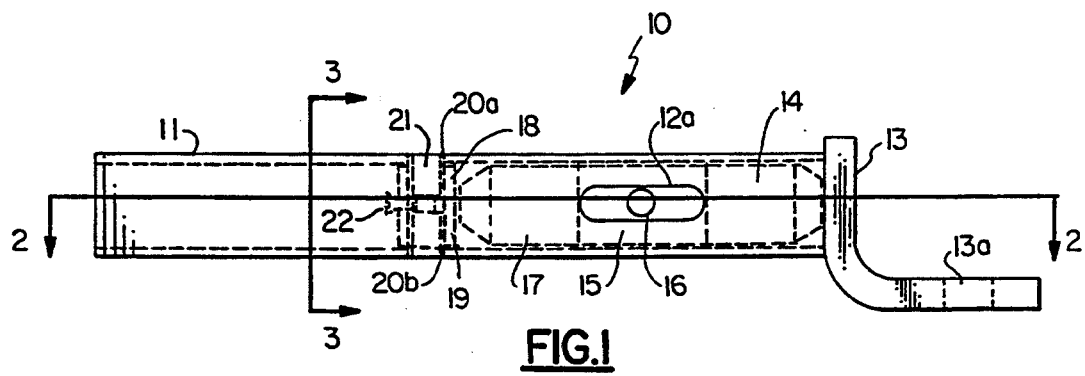
FIG. 1 is a side view of a preferred energy dampening drawbar.
Figure 2:
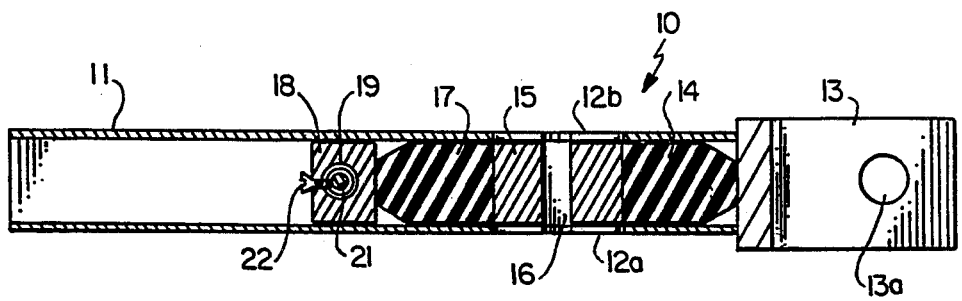
FIG. 2 is a cross sectional view taken on the line 2—2 in FIG. 1.

Referring to FIG. 1 and to FIG. 2 an energy dampening drawbar, is identified, generally, by the numeral 10, and is illustrated as an aid to the following detailed description. An elongated shank 11 is constructed of square tubing so that it will fit into receiver types of hitches.

While square tubing is preferred, for the reason identified above, the shank 11 can be formed from either round, rectangular, or polygonal stock when it is to be used with more specialized types of hitches.

The shank 11 has two elongated slots 12a and 12b located one on one side of the shank 11 and one slot on the opposite side. Only the one slot 12a is visible in FIG. 1 with the other slot 12b being present on the opposite surface of the shank 11 and in alignment with the slot 12a.

A plate 13 is welded to one end of the shank 11. The opposite end of the shank 11 is open to provide for both assembly and maintenance access to the various component parts that are located inside the shank 11 of the drawbar 10.

The plate 13 has a hole 13a therein for accepting a hitch ball that is not shown in this view. A first cushion block 14 having a size and shape so that it will fit within the shank 11 from the open end and rest against the ball plate 13. The ball plate 13 serves as a first restraint means to prevent further movement of the first cushion block 14 within the shank 11 toward the ball plate 13.

A pin block 15 is contiguous with the first cushion block 14 and has a hole 16 in aligned with the elongated slots 12a and 12b.

A second cushion block 17 having a size and shape to fit within the hollow shank 11 and is contiguous with the pin block 15. A block 18 fits within the shank 11 and is contiguous with the second cushion block 17.

Figure 3:
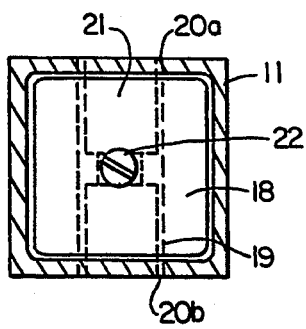
FIG. 3 is a cross sectional view taken on the line 3—3 in FIG. 1.
Figure 4:
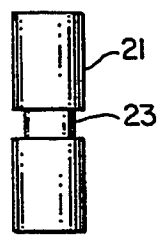
FIG. 4 is a side view showing additional detail of an end block pin as used in the drawbar.

Referring to FIG. 3 and FIG. 4, the block 18 has a hole 19 extending through it. The shank 11 also has two holes 20a and 20b that align with the hole 19 when the block 18 is inserted in the shank 11.

A pin 21 through the holes 20a and 20b of the shank 11 and through the hole 19 secures the block 18 in position within the shank 11. The block 18 is a second restraint means to prevent the second cushion block 17 from further movement within the shank 11.

The pin 21 is secured in position by a threaded set screw 22 that is threaded in the block 18. The set screw 22 is tightened until it bears against a recess 23 formed in the pin 21. The set screw 22, after being firmly tightened, secures the block 18 in position within the hollow shank 11.

Since the purpose of the energy dampening drawbar 10 is to substantially eliminate shock impulses between the towing vehicle and the trailer, it is important that the component parts do not introduce additional slack that might aggravate the situation.

After assembly, a compressive force, such as is obtained from a press, is applied through the open end of the shank 11 against the block 18. The purpose of applying a compressive force is to remove any slack between the component parts within the shank 11 and to also apply a slight compressive pre-load to the first and second cushion blocks 14 and 17. The amount of pre-load is selected according to the energy dampening characteristics desired for a particular drawbar 10.

The first cushion block 14 and the second cushion block 17 are constructed according to the energy dampening characteristics that are desired for a particular drawbar 10. The first and second cushion blocks 14 and 17, preferably are constructed of an elastomeric material, such as, for example, natural and synthetic rubber and urethane. The material that is selected must provide a desired resistance to compression.

For example, the second cushion block 17 experiences all of the loading that is normally associated with towing a trailer and, as such, is usually under a considerable compressire load. Therefore, the elastomeric material selected for the second cushion block 17 will have a higher durometer value than that selected for the first cushion block 14.

Certain special drawbar uses require exactly the opposite selection of properties for each of the cushion blocks 14 and 17.

The shape and size of each cushion block 14 and 17 also are varied to accommodate various types of material used in the construction of the shank 11 and, also, to vary the dampening characteristics for the drawbar 10. Each cushion block 14 and 17 is formed of a particular elastomeric material having a size and shape to permit each cushion block 14 and 17 to be inserted into the hollow chamber formed by the shank 11.

For certain situations, a generally cylindrical shape is preferred to permit each cushion block 14 and 17 to deform during compression so as to accommodate the available space within a typical shank 11 having a square cross section. Each cushion block 14 and 17 is constructed, when required, to have a tapered end as shown in FIG. 1 and FIG. 2.

In certain situations, such as when it is desirable to obtain a progressive and variable dampening characteristic, the desired rate of dampening may not be obtainable by the use of only one type of elastomeric material for each of the cushion blocks 14 and 17. In such situations, each cushion block 14 and 17 is replaced by a plurality of cushion blocks on either side of the pin block 15. When a plurality of cushion blocks are used, each block is selected to provide a particular desired dampening characteristic.

A modification to which the structure of the invention is adaptable permits the elastomeric material of either cushion block 14 and 17 to be replaced by a coil spring to provide the desired dampening characteristics for certain specialized situations.

In another modification, the slots 12a and 12b, or the plug holes 20a and 20b are located elsewhere along the shank 11, or they are located on a different surface plane of the shank 11 tube as is required to satisfy use of the drawbar 10 with specialized types of hitches, including certain types of wide ranging hitches. Similarly, if desired, a separate restraint is affixed to the shank 11 and is used to prevent motion by the first cushion block 14, instead of relying upon the ball plate 13 to restrain the first cushion block 14.

OPERATION

In use, the drawbar 10 is inserted into a receiver tube that is a part of the hitch mechanism of a towing vehicle, the shape of the receiver tube is similar, generally, to that of the elongated hollow shank 11. The interior dimensions of most receiver tubes are somewhat larger than the outside dimensions of the shank 11 to permit the shank 11 to be inserted quite readily into the receiver tube of a hitch mechanism.

When a conventional drawbar is used with many receiver tubes of today's hitches, a hitch pin is used to secure the conventional drawbar within these receiver tubes. Normally, the hitch pin passes through a pair of holes that are provided in a receiver tube and, also, through corresponding holes in the conventional drawbar that align with the receiver tube holes.

However, when the energy dampening drawbar 10 of the present invention is used, the drawbar 10 is inserted into a receiver tube and a hitch pin is inserted through the holes in the receiver tube and through the slots 12a and 12b of the shank 11 and also through the hole 16 of the pin block 15.

When the drawbar 10 of the invention is constructed, the hole 16 of the pin block 15 is within the opening of the slots 12a and 12b. This permits the hole 16 to be aligned with holes in a receiver tube when the drawbar 10 is inserted. A hitch pin of any suitable type is inserted, and the drawbar 10 is secured within the receiver tube.

Should a failure of certain critical component parts of the drawbar 10 occur, built-in safeguards ensure that the drawbar 10 will not uncouple from the receiver tube. For example, if the end block pin 21 were to fail or to become dislodged from the block 18, the block 15 would be free to slide unimpeded longitudinally in a direction towards the open end of the shank 11. However, the hitch pin would eventually come into contact with one end of the two slots 12a and 12b, thereby preventing further travel by the block 15 and, thus, securing the drawbar 10 in the receiver tube during such a failure.

A hitch coupler on a trailer is connected to an appropriate hitch ball that normally passes through the hole 13a in the ball plate 13 to secure the trailer to the vehicle for towing.

When towing, the transfer of the force occurring between the towing vehicle and the trailer is eventually transmitted through the hitch coupling and to the shank 11 of the drawbar 10. As the towing vehicle accelerates initially, the shank 11 is pulled in a direction generally out of the receiver tube. The shank 11 is able to travel longitudinally within a maximum range of motion as determined by the length of the slots 12a and 12b. The block 15 is held stationary relative to the holes in a receiver tube by the hitch pin passing through.

During acceleration, as the shank 11 is pulled slightly out from a receiver tube, the pin block 15 will bear against the second cushion block 17, which is compressed even further. The amount of the compression that is experienced by the second cushion block 17 is in proportion to the force applied by the towing vehicle and to the inertia of the trailer. A greater or lesser applied force will result in the greater or lesser proportional longitudinal motion of the shank 11 relative to the pin block 15.

The specific distance that the shank 11 actually moves relative to the pin block 15 for any given applied force is determined primarily by both the elastomeric and deformation properties of the second cushion block 17.

The act of compressing the second cushion block 17 reduces the severity of a jolt that would otherwise have been felt by occupants in the towing vehicle. During normal transit, the second cushion block 17 will either relax or compress periodically in response to the exerted forces.

A similar process occurs during deceleration of the towing vehicle, where the first cushion block 14 is compressed in proportion to the forces experienced. The functioning of the first cushion block 14 complements that of the second cushion block 17. During transit, therefore, the first cushion block 14 will either relax or compress periodically in response to the exerted forces.

The compression and deformation of either of the cushion blocks 14 and 17 absorbs shock impulses and, later, returns the energy so absorbed during the subsequent relaxation and expansion of either of the elastomeric cushion blocks 14 or 17. Shock impulses are decreased substantially by this action, and the ride as perceived by occupants is smoothed, and the wear and tear upon respective component parts is lessened also.

The invention has been shown, described and illustrated in substantial detail with reference to the presently preferred embodiment. It will be understood by those skilled in this art that other and further changes and modifications may be made without departing from the spirit and scope of the invention, which is defined by the claims appended hereto.

What is claimed is:

1. An energy dampening drawbar for connecting a trailer to a towing vehicle, comprising:

an elongated hollow shank of predetermined outer shape and size with an elongated inner chamber of predetermined dimensions, said hollow shank having a top and an opposite bottom and having a first end and having a second end that is disposed opposite to said first end and having a first side and having a second side that is disposed opposite to and parallel with said first side, and including a first slot in said first side and including a second slot in said second side, said first slot and said second slot being in parallel alignment with respect to each other and having a greater length than width, said greater length being in parallel alignment with the longitudinal axis of said hollow shank, and, said hollow shank including means for providing a barrier at said first end and means for providing a barrier at said second end;

a block located within said chamber that is capable of longitudinal motion within said chamber, said block having a first block end disposed toward said first end and having a second block end that is disposed opposite to and parallel with said first block end and is disposed toward said second end and having a block top and an opposite block bottom and having a first block side and a second block side, said first block side and said second block side being disposed perpendicular with respect to said first block end and said second block end and with respect to said block top and said block bottom and further being disposed parallel with respect to said first side and said second side of said hollow shank, said block including a hole, said hole disposed from said first block side through to said second block side wherein said hole aligns with said first slot and said second slot;

a first resilient block having a first resilient block end and a second resilient block end, said first resilient block located inside said chamber and having said first resilient block end disposed toward said first end and having said second resilient block end disposed toward said first block end wherein said means for providing a barrier at said first end prevents the longitudinal motion of said first resilient block end in a first direction toward said first end;

a second resilient block having a second resilient block first end a second resilient block second end said second resilient block located inside said chamber and having said second resilient block second end disposed toward said second end and having said second resilient block first end disposed toward said second block end wherein said means for providing a barrier at said second end prevents the longitudinal motion of said second resilient block second end in a second direction that is generally opposite said first direction; and means for attaching said hollow shank to a towing vehicle, said means for attaching including said hole in said block that is aligned with said first slot and said second slot wherein said hollow shank is adapted for insertion into a receiver tube that is attached to said towing vehicle, said receiver tube having an opening through a pair of parallel and opposite sides of said receiver tube and adapted for inserting a retaining pin through said opening, through said first slot and said second slot and said hole through said block, whereby said block is maintained in position relative to said receiver tube and said hollow shank is adapted for longitudinal displacement within said receiver tube as defined by the length of said first slot and second slot and as further defined by the resiliency of said first resilient block and said second resilient block.

2. An energy dampening drawbar, comprising:

an elongated hollow shank of a predetermined shape and size with opposite ends and opposite sides and having two co-axial parallel slots formed therein on said opposite sides, said two co-axial parallel slots each having a length that is greater than a width, said length aligning with the longitudinal axis of said shank;

a first cushion having a predetermined shape and size located inside said shank;

a second cushion having a predetermined shape and size located inside said shank;

a first restraint means attached to said shank for limiting the longitudinal motion in a first direction of said first cushion within said shank, said first cushion being adjacent to said first restraint means;

a second restraint means attached to said shank for limiting the longitudinal motion in a second direction that is generally opposite to said first direction of said second cushion within said shank, said second cushion being adjacent to said second restraint means; and a pin block having a hole therein located inside said shank and having said first cushion situated adjacent a first side of said pin block and having said second cushion situated adjacent a second side of said pin block that is generally opposite to said first side and having said hole align with a portion of said two co-axial parallel slots formed in said shank.

3. An energy dampening drawbar as defined by claim 2 wherein said first restraint means includes a ball plate extending from said shank for attachment of a trailer coupling apparatus thereto.

4. An energy dampening drawbar as defined by claim 2 wherein said first cushion includes blocks formed of an elastomer.

5. An energy dampening drawbar as defined by claim 4 wherein said elastomer includes urethane.

6. An energy dampening drawbar as defined by claim 4 wherein said elastomer includes rubber.

7. An energy dampening drawbar as defined by claim 2 wherein said second cushion includes blocks formed of an elastomer.

8. An energy dampening drawbar as defined by claim 7 wherein said elastomer includes urethane.

9. An energy dampening drawbar as defined by claim 7 wherein said elastomer includes rubber.

10. An energy dampening drawbar as defined by claim 2 wherein said shank is open at one of said opposite ends.

11. An energy dampening drawbar as defined by claim 2 wherein said second restraint means includes an end block attached to said shank.

12. An energy dampening drawbar as defined by claim 11 wherein said end block includes means for securing said end block in a predetermined position to said shank.

* * * * *